United States Patent [19]

Murphy

[11] Patent Number: 5,061,915
[45] Date of Patent: Oct. 29, 1991

[54] ANTI-THEFT DEVICE FOR MOTORIZED VEHICLES

[76] Inventor: Del A. Murphy, 6210 Silver Leaf, League City, Tex. 77573

[21] Appl. No.: 536,709

[22] Filed: Jun. 12, 1990

Related U.S. Application Data

[63] Continuation-in-part of Ser. No. 526,971, May 22, 1990, abandoned.

[51] Int. Cl.[5] .......................... B60R 25/10; B60L 1/00
[52] U.S. Cl. .................................. 340/426; 340/528;
340/543; 307/10.1; 307/10.2; 307/10.3;
307/10.6
[58] Field of Search ............... 340/426, 430, 527, 528,
340/543; 307/9.1, 10.1, 10.2, 10.3, 10.4, 10.6

[56] References Cited

U.S. PATENT DOCUMENTS

| | | |
|---|---|---|
| 3,824,403 | 7/1974 | McGuirk, Jr. . |
| 3,849,663 | 11/1974 | Bogusz . |
| 4,160,916 | 7/1979 | Payasideris .................... 307/10.6 |
| 4,507,664 | 3/1985 | Abranhamson . |
| 4,600,966 | 7/1986 | Mueller et al. .................... 307/10.6 |
| 4,636,651 | 1/1987 | Kilgore . |
| 4,762,198 | 8/1988 | Vagnone et al. . |
| 4,792,792 | 12/1988 | Costino . |

Primary Examiner—Donnie L. Crosland
Attorney, Agent, or Firm—Vaden, Eickenroht, Thompson & Boulware

[57] ABSTRACT

An anti-theft device for motorized vehicles consisting of three relays and a number of switches controlled by the relays that are wired into the existing electrical system of the vehicle. The first relay energizes in response to an electrical signal generated by the existing electrical system and controls the sequencing of the disarming steps. The second relay disarms the device when energized by a signal generated in the existing electrical system but only after the first relay has been energized. The third relay activates the alarm and/or disables the vehicle starter when energized. The third relay will energize when there is an attempt to start a vehicle without following the prescribed sequence of disarming steps and is prevented from sounding an alarm and/or disabling the vehicle starter by the second relay when the second relay is energized. A connector consisting of a male-female pair that is installed with the pair disconnected. The connector allows the vehicle operator to disarm the system from inside the vehicle once the alarm is triggered. The operator can thereby practice the sequence of disarming steps until he is comfortable with the invention, whereupon he can simply connect the male-female pair to prevent disarming of the device from inside the vehicle once the device is triggered. The valet switch switches power from the electrical system directly to the third relay to energize the third relay and activate the device unless the valet switch is used while the device has already been disarmed or disabled.

9 Claims, 1 Drawing Sheet

ANTI-THEFT DEVICE FOR MOTORIZED VEHICLES

This application is a continuation-in-part of Ser. No. 07/526,971 filed May 22, 1990, now abandoned.

This invention relates to an anti-theft device for motorized vehicles such as automobiles.

There are several variations of anti-theft devices in the prior art, the most common being an alarm that is armed and disarmed by a battery operated controller on the owner's key chain. Another variation can be disarmed by setting switches mounted in the vehicle interior, sometimes being wired into the vehicle's electrical system so that switches controlling electrical features of the vehicle such as headlights, brake lights, cigarette lighters, etc., double as disarming switches. Virtually all variations have some characteristics, such as a dashboard indicator that "tip-off" a thief that the vehicle is equipped with an anti-theft device. Most variations also have a "valet switch", which disables the device. Such switches are commonly used to disable the device while the vehicle is in the care and custody of someone other than the owner by the owner's permission, i.e., a mechanic making repairs to the vehicle.

Each of these variations has significant drawbacks. The battery operated controller can be used by a thief who has stolen it to gain unauthorized access to the vehicle without sounding the alarm. Interior switches can be randomly set and reset by a thief who has gained unauthorized entry to the vehicle and has been tipped off to the presence of an anti-theft device in an attempt to "get lucky" and find the one switch that will disarm the device. Also, valet switches found in the prior art disable the devices while the device is armed, thereby allowing a thief to completely disable the system. It is the object of this invention to eliminate each of these drawbacks.

It is another an object of this invention to provide an anti-theft device that disables a vehicle from starting unless a prescribed sequence of disarming steps is performed.

It is also an object of this invention to provide an anti-theft device that will sound an alarm unless a prescribed sequence of disarming steps is performed.

It is a further object of this invention to provide an anti-theft device that can be disabled with a removable connector by the owner of the vehicle at whatever time the vehicle owner wishes.

It is a further object of this invention to provide an anti-theft device with a valet switch that will disable the device only when used while the device has been disarmed or disabled.

The invention comprises three relays and a plurality of switches controlled by the relays that are wired into the existing electrical system of the vehicle. The first relay energizes in response to an electrical signal generated by the existing electrical system and controls the sequencing of the disarming steps. The second relay disarms the device when energized by a signal generated in the existing electrical system but only after the first relay has been energized. The third relay activates the alarm and/or disables the vehicle starter when energized. The third relay will energize when there is an attempt to start a vehicle without following the prescribed sequence of disarming steps and is prevented from sounding an alarm and/or disabling the vehicle starter by the second relay when the second relay is energized. The invention has a connector consisting of a male-female pair that is installed with the pair disconnected. The connector allows the vehicle operator to disarm the system from inside the vehicle once the alarm is triggered. The operator can thereby practice the sequence of disarming steps until he is comfortable with the invention, whereupon he can simply connect the male-female pair to prevent disarming of the device from inside the vehicle once the device is triggered. The invention's valet switch switches power from the electrical system directly to the third relay to energize the third relay and activate the device unless the valet switch is used while the device has already been disarmed or disabled.

Other objects, advantages, and features of this invention will become apparent to a person skilled in the art from a consideration of this specification, including the appended claims and the attached drawings.

IN THE DRAWINGS

Figure 1:
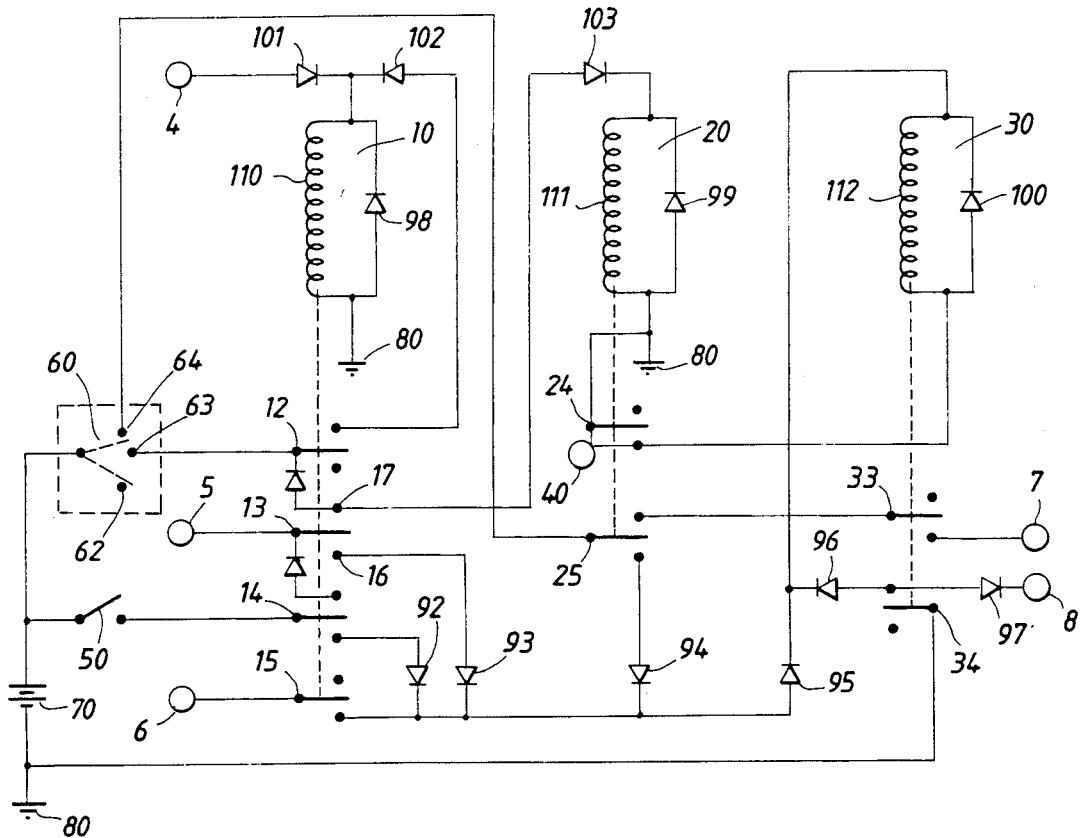
FIG. 1 is a schematic diagram of the relays and circuits of the device and shows necessary portions of the vehicle's pre-existing electrical system.

In FIG. 1, the preferred embodiment of this invention is illustrated. Signal sources 4-6, keyed switch 60, battery 70, and common ground 80 are all features of the vehicle's existing electrical system. Keyed switch 60 is typically located either in the steering column or the dashboard of an automobile. Poles 62-64 of keyed switch 60 correspond to the off, on, and crank key positions, respectively.

Starter 7 is also a part of the vehicle into which the device is wired. Typically, power is delivered directly to starter 7 from the vehicle's electrical system when keyed switch 60 is in the crank position, i.e., switched to pole 64. Alarm 8 in the preferred embodiment is the vehicle's horn. The device could just as easily activate some other type of alarm, such as a siren, as easily as the horn, but use of the horn has the distinct advantage of making the device more difficult for a potential thief to detect. It is to be understood, however, that the invention contemplates the use of many different types of alarms as are currently found in the prior art.

First relay 10, as contemplated by the preferred embodiment, comprises coil 110 and diode 98 connected to common ground 80. First relay 10 energizes upon receiving an electrical signal from signal source 4. The signal can be generated in any number of ways. For example, the signal can be the brake pedal. The electrical signal is generated when the vehicle operator steps on the brake pedal, which energizes the circuit that lights the brake lights thereby also energizing first relay 10. Source 4 should be any signal generation source in the electrical system which is normally off, i.e., brake pedal or headlight switch. It is nevertheless not required that source 4 be normally off and source 4 can operate either independently or dependently of the position of keyed switch 60. Switches 12 through 15 are opened from their normally closed, or down, positions by first relay 10 when first relay 10 is energized.

Second relay 20 includes coil 111 and diode 99 and is connected to common ground 80. Second relay 20 energizes upon receipt of power from pole 17 of switch 13 through diode 103 when switch 13 switches power from source 5 in the electrical system to pole 17 from pole 16. Source 5 must operate independently of the position of keyed switch 60 and should also be a normally off source in the electrical system. Second relay 20 opens switches 24 through 25 from their normally closed, or down, position when energized.

Third relay 30 energizes when it receives power from any one of a number of sources while connected to ground by switch 24. If third relay 30 is disconnected from common ground 80 by switch 24, it will not energize. Third relay 30 opens switches 33-34 from the normally closed, or down, position when energized. It is to be noted that the invention in its preferred embodiment employs switch 33 and switch 34 to both disable the starter and to activate the alarm although other embodiments may admit to either disabling the starter or activating the alarm without performing both functions. The preferred embodiment of the invention also contemplates the use of switches that cannot disarm the device but can in any event disable the starter or activate the alarm. Switch 15 connects and disconnects power received from source 6 to third relay 30. The signal from source 6 can be generated by any means available in the electrical system such as switches, power window switches, etc. In practice, there can be any number of such switches but for clarification and ease of illustration only representative switch 15 is shown. Operation of valet switch 50 and trigger switch 14 will be described hereinafter.

Switch 12 keeps the device disarmed once the proper sequence has been executed. Normally closed, switch 12 opens when first relay 10 is energized and draws power from the electrical system via now-open switches 14 or 13 when valet switch 50 is closed or when a signal is generated in source 5, respectively. Power is also drawn directly from the electrical system when keyed switch 60 is switched to pole 63, i.e., the key is in the "on" position.

In operation, switches 12-15, 24-25, and 33-34 are normally closed when the vehicle operator enters the vehicle. If the operator attempts to start the vehicle before attempting to disarm the device, will energize third relay 30 with power from battery 70 through pole 64 of keyed switch 60 and closed switch 25. Energized third relay 30 then opens switches 33 and 34 to prevent power from reaching the starter, thereby disabling the starter, and to transmit power to activate the alarm. As the driver randomly flips switches in an attempt to get lucky and disarm the system, if source 5 or source 6 generates a signal before switches 13 or 15 are open, third relay 30 will energize and open switches 33 through 34.

Proper sequencing is initiated by generating an electrical signal from source 4 to energize first relay 10, thereby opening switches 12-15. Switch 13 will not energize second relay 20 and switch 15 will not energize third relay 30 until such time as signals are generated by source 5 and source 6, respectively. At this point in the sequence, if the signal is generated in source 6, third relay 30 will energize and disable the starter 7 and activate the alarm 8. If keyed switch 60 is switched to pole 63 by placing the key in the "on" position, there will be no effect. If keyed switch 60 is switched to pole 64 thereby placing the key in the crank position, third relay 30 will be energized via power transmitted through closed switch 25.

Proper sequencing is continued by generating a signal in source 5. Second relay 20 is then energized and opens switches 24 and 25. When switch 24 is opened, it disconnects third relay 30 from common ground 80 as long as connector 40 is disconnected so that third relay 30 cannot energize, thereby disarming the anti-theft device. Starter 7 is enabled when switch 25 is open, thereby closing the circuit so that power from the electrical system is transmitted to starter 7 when keyed switch 60 is switched to pole 64, i.e., when the key is placed in the crank position.

Connector 40 consists of a male-female pair of connectors and is installed with the pair disconnected, and thereby disconnects third relay 30 from common ground 80 until the pair is connected by the vehicle owner except through switch 24. Connector 40 allows the vehicle owner to practice using the invention with the ability to disarm the invention from inside the vehicle once the invention disables starter 7 or activates alarm 8 until such time as the driver feels comfortable with using the sequenced steps to disarm the device. Once the driver has practiced the sequence of disarming steps and is satisfied that he can use the invention without problem, he can then connect the male-female pair of connector 40 and thereby prevent disarming of the invention from inside the vehicle.

The invention also employs a valet switch 50 that can disable the system only while the device is disarmed. When the device is armed, trigger switch 14 is closed and valet switch 50 is open. If valet switch 50 is closed, then third relay 30 is energized and starter 7 is disabled and horn 8 is activated. Valet trigger switch 14 is normally closed but when open, switches power received from the electrical system through valet switch 50, when valet switch 50 is closed, and through open switch 13 to disable the device. This will in turn energize second relay 20 again. If the device is disarmed, third relay 30 cannot be energized regardless of whether switches 50 and 14 are open or closed.

Figure 2:
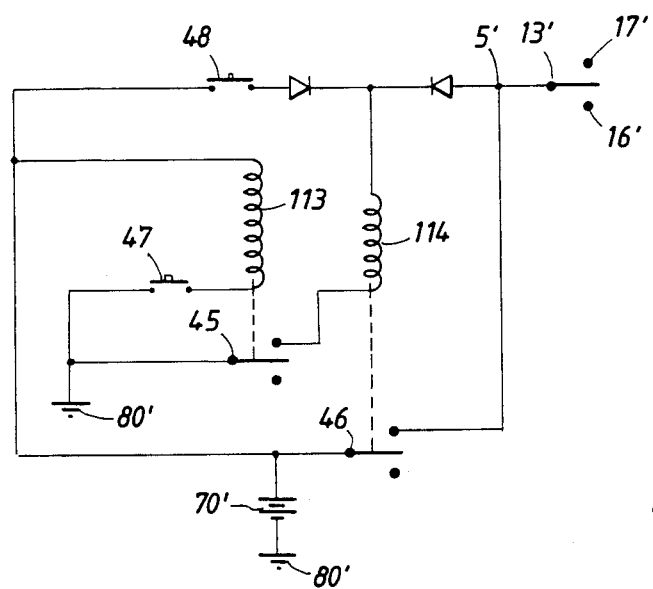
FIG. 2 illustrates an alternative embodiment of the invention wherein the embodiment in FIG. 1 is equipped with additional circuitry so that a source independent of key position may be used in the second step of the disarming sequence.

An alternative embodiment is illustrated in FIG. 2 that would allow the invention to be configured so that source 5 in FIG. 1 is replaced by a circuit that will generate a signal for the second step in the sequence independently of key position. Components appearing in both FIG. 1 and FIG. 2 are designated in FIG. 2 with like numbers that are primed. Hence, switch 13 in FIG. 1 is switch 13' in FIG. 2. Node 5' in FIG. 2 represents the point at which source 5 in FIG. 1 generates the signal that is transmitted via switch 13 (i.e., switch 13' in FIG. 2). Note also that only certain components of the embodiment in FIG. 1 are depicted in FIG. 2. This is because the alternative embodiment differs only in those particulars depicted in FIG. 2 and, as explained below, incorporates the embodiment of FIG. 1 without changing its operation other than allowing source 5 in FIG. 1 to be replaced so that the second sequencing step can occur independently of key position.

Switch 47, in the alternative preferred embodiment, is the door switch of the car. The switch energizes coil 113 when the door is closed and de-energizes coil 113 when the door is open. When coil 113 is energized, it opens normally closed switch 45, thereby connecting coil 114 to ground and enabling it to energize. Coil 114 is energized on receiving 12 volts from battery 70' when normally open, momentary switch 48 is closed and switch 45 is open. The 12 volts from battery 70' is generated independently of the position of keyed switch 60 shown in FIG. 1. Conversely, coil 114 de-energizes when switch 45 is closed and disconnects coil 114 from ground 80'. Coil 114 when energized opens normally closed switch 46 to connect node 5' to battery 70'.

In operation, the embodiment in FIG. 2 does not alter the actual sequencing of steps but only whether the signal transmitted via switch 13 (i.e., switch 13') is generated independently of the position of keyed switch 60 in FIG. 1. Switch 47 is closed by virtue of the door being shut and coil 113 is energized, thereby opening switch 45. Coil 114 is then enabled by virtue of connection to ground 80' via open switch 45. After properly initiating sequencing as heretofore described, the operator closes switch 48 and 12 volts is transmitted through node 5' and switch 13'. If switch 48 is closed out of sequence, then alarm 8 in FIG. 1 is triggered and starter 7 disabled as was previously described.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated and is within the scope of the claims. Because many possible embodiments may be made of the invention without departing from the scope thereof, it is to be understood that all of the matters herein set forth are shown in the accompanying drawings is to be interpreted as illustrative and not in a limiting sense.

What is claimed is:

1. An anti-theft device for a motorized vehicle with an electrical system having a common ground and a starter; comprising: a first relay that energizes in response to an electrical signal from the electrical system; a first switch having a first and a second pole that switches power from the electrical system between the first and the second pole of said first switch; a second relay that energizes only when said first switch switches power from the first pole of said first switch to the second pole of said first switch after said first relay is energized; a second switch having a first and a second pole that switches power from the electrical system to the first pole of said second switch until said second relay is energized, whereupon said second switch switches power to the second pole of said second switch; a third relay that energizes when power from the electrical system is switched by said second switch to the second pole of said second switch while said third relay is connected to the common ground; a third switch connecting said third relay to the common ground that disconnects said third relay from the common ground when said second relay is energized; and a fourth switch having a first pole electrically connected to the starter and a second pole, said fourth switch switching power from the second pole of said second switch to the starter unless said third relay is energized.

2. The anti-theft device of claim 1, further comprising a fifth switch that switches power from the electrical system to an alarm when said third relay is energized.

3. The anti-theft device of claim 2 wherein said fifth switch also switches power to said third relay once said third relay is energized.

4. An anti-theft device for a motorized vehicle with an alarm and an electrical system having a common ground, comprising: a first relay that energizes in response to an electrical signal from the electrical system; a first switch having a first and a second pole that switches power from the electrical system between the first and the second pole of said first switch; a second relay that energizes only when said first switch switches power from the first pole of said first switch to the second pole of said first switch after said first relay is energized; a second switch having a first and a second pole that switches power from the electrical system to the first pole of said second switch until said second relay is energized, whereupon said second switch switches power to the second pole of said switch; a third relay that energizes when power from the electrical system is switched by said second switch to the second pole of said second switch while said third relay is connected to the common ground; a third switch connecting said third relay to the common ground that disconnects said third relay from the common ground when said second relay is energized; and a fourth switch that switches power from the electrical system to the alarm when said third relay is energized.

5. The anti-theft device of claim 4 wherein said fourth switch also switches power to said third relay once said third relay is energized.

6. The anti-theft apparatus of claim 4 or claim 5 further comprising a fifth switch having a first pole electrically connected to the starter of the motorized vehicle and a second pole, said fifth switch switching power from the second pole of said second switch to the starter unless said third relay is energized.

7. An anti-theft apparatus for a motorized vehicle with an electrical system having a common ground, a starter, and an alarm, comprising: a first relay that energizes in response to an electrical signal from the electrical system; a first switch having a first and a second pole that switches power from the electrical system between the first and the second pole of said first switch; a second relay that energizes only when said first switch switches power from the first pole of said first switch to the second pole of said first switch after said first relay is energized; a second switch having a first and a second pole that switches power from the electrical system to the first pole of said second switch until said second relay is energized, whereupon said second switch switches power to the second pole of said switch; a third relay that energizes when power from the electrical system is switched by said second switch to the second pole of said second switch while said third relay is connected to the common ground; a third switch connecting said third relay to the common ground that disconnects said third relay from common ground when said second relay is energized; a fourth switch that switches power from the electrical system to the alarm when said third relay is energized; and a fifth switch having a first pole electrically connected to the starter and said third relay and a second pole, said fourth switch switching power from the second pole of said second switch to the starter and to said third relay unless said third relay is energized.

8. The anti-theft apparatus of claims 1, 4, or 7 further comprising a removable reset connector short circuiting said third switch.

9. The anti-theft apparatus of claims 1, 4, or 7 further comprising: a first valet switch that transmits power from the electrical system when closed; and a second valet switches that switches power received from said first valet switch between said first switch and said third relay.

* * * * *